United States Patent [19]

Ozaki

[11] Patent Number: 4,794,007
[45] Date of Patent: Dec. 27, 1988

[54] PROCESS FOR PRODUCING GROUND FISH

[75] Inventor: Hirotada Ozaki, Tokyo, Japan

[73] Assignee: Taiyo Fishery Co., Ltd., Tokyo, Japan

[21] Appl. No.: 939,368

[22] Filed: Dec. 8, 1986

[30] Foreign Application Priority Data

Dec. 16, 1985 [JP] Japan .................. 60-282487

[51] Int. Cl.⁴ ............................ A23L 1/325
[52] U.S. Cl. .................. 426/271; 426/479; 426/495; 426/643
[58] Field of Search ............ 426/271, 643, 646, 478, 426/479, 495

[56] References Cited

U.S. PATENT DOCUMENTS

| | | | |
|---|---|---|---|
| 2,680,076 | 6/1954 | Swaine | 426/271 |
| 2,937,096 | 5/1960 | Geiger et al. | 426/271 X |
| 3,094,487 | 6/1963 | Van Arsdell | 426/479 X |
| 3,804,964 | 4/1974 | Hogstedt et al. | 426/479 X |
| 4,284,653 | 8/1981 | Shigeoka eet al. | 426/643 X |
| 4,439,456 | 3/1984 | Kammuri et al. | 426/643 X |
| 4,464,404 | 8/1984 | Ueno et al. | 426/643 X |

FOREIGN PATENT DOCUMENTS

| | | | |
|---|---|---|---|
| 2843230 | 4/1979 | Fed. Rep. of Germany | 426/643 |
| 0056661 | 4/1983 | Japan | 426/643 |

Primary Examiner—Arthur L. Corbin
Attorney, Agent, or Firm—Frishauf, Holtz, Goodman & Woodward

[57] ABSTRACT

The process for producing a ground meat of the present invention comprises grinding fish bodies or a fish meat together with water containing a protease inhibitor and/or a chelating agent and having an adjusted ionic strength; filtering the ground mixture thus obtained to thereby remove fine bones, skin and pieces of the internals and binding tissues therefrom; and then centrifuging the obtained liquid phase.

9 Claims, No Drawings

PROCESS FOR PRODUCING GROUND FISH

BACKGROUND OF THE INVENTION (1) Field of the Invention:

This invention relates to a process for producing a ground melt. According to the process of the present invention, combined effects of the control of ionic strength, employment of additives and separation and dehydration by centrifugation makes it possible to grind fish bodies even as such to thereby give an excellent ground meat superior in the jelly strength (i.e. the gel strength) to conventional ones. Thus marine products can be utilized more effectively.

(2) Description of Prior Art:

Conventionally the production of ground fish meat is effected by refining minced meat; leaching said minced meat with water; and treating the same with a rotary strainer, a refiner and a screw press successively.

Further, leaching with NaCl for dehydration and decoloring and with $Ca^{2+}$ and $Mg^{2+}$ for dehydration is sometimes effected in a conventional process for producing ground fish meat.

However in these conventional processes, ground fish meat can be produced only from minced meat. That is to say, it is practically impossible to produce ground fish meat not only from round or whole fish bodies but also from semidresses which are obtained by removing the internals from fish bodies, dresses which are obtained by further removing the heads therefrom, fillets which are obtained by further removing the bones therefrom, and skinless fillets which are obtained by further removing the skin therefrom. There has been attempted to produce ground meat from semidresses and dresses in order to elevate the yield and to save labor. However the ground meat thus obtained has poor properties and/or hardly gels unless starch is added thereto. Further cruschyma meat is completely dissolved without forming any gel. This is because the activities of fish meat proteins other than salt-soluble ones as gelation inhibitors (enzymes), which are particularly high in the cases of round fish bodies to fillets, cannot be inhibited. Furthermore there are some reasons therefor such that the prolonged treatment is liable to be accompanied by inhibition of gelation; that an increase in the treatment temperature accelerates the inhibition of gelation; that there has been established no appropriate method for grinding and fractionating (filtering) fish bodies or tissues in a highly moisten system; and that salt-soluble proteins in fish meat ground to the myofibril level cannot be recovered with a rotary strainer and a screw press.

Relating the points as discussed above, only limited fishes including Alaska pollack, croaker, sardine, mackerel and pike conger are available as raw materials in conventional processes for producing ground fish meat. Thus other marine products such as pectoral rattail, deep-sea rattail, capp, krill, cuttlefish, trepang and prawn cannot be utilized therein.

In addition, in conventional processes for producing ground meat, an insufficient fractionation of salt-soluble proteins results in the contamination of the obtained ground meat with a small amount of water-soluble proteins and substrate proteins, which makes it impossible to obtain excellent ground meat mainly comprising salt-soluble proteins affecting the gel properties and having a high jelly strength. Namely a conventional process for producing ground meat comprises solid phase separation wherein water-soluble proteins are removed mainly by leaching a raw material with water followed by treating the same with a rotary strainer. However some portion of salt-soluble proteins would be eluted during the leaching step or flow from the strainer. Furthermore the separation of the water-soluble proteins with the rotary strainer is extremely insufficient. Then, in a conventional process for producing ground meat, the fish meat from the above step is further treated with a refiner to thereby remove substrate proteins therefrom. However this treatment, which is rough filtration, cannot completely separate the substrate proteins. In addition, it is impossible to completely remove gelation inhibitors from the fish meat thereby since this treatment is effected on muscle bundles and cannot remove the water-soluble proteins.

Furthermore the following facts make it impossible to obtain excellent ground meat by conventional processes. Namely significantly high evolution of heat caused by treating a number of continuous or uncontinuous muscle bundles with a rotary strainer and a refiner several times and further with a screw press for a prolonged period once to several times results in a rise in the temperature of fish meat proteins which are unstable to heat to thereby denature the same. In addition, it is necessary to rapidly remove fish meat proteins other than salt-soluble ones since they act as enzymes inhibiting gelation. However the prolonged treatment, i.e., one to three hours in the conventional processes lowers the activities of the salt-soluble proteins, which brings about denaturation of the fish meat. Further a ground fish meat product free from fishy smell and having a preferable taste and a white color is highly valued from the commercial viewpoint. However conventional processes can hardly give such a ground meat product of a high commercial value because of an insufficient removal of blood, water-soluble proteins and chromo-proteins.

It is further preferable that a ground meat product contain a constant amount of moisture. However it is difficult to maintain the moisture content of a ground meat product produced by a conventional process constant since the moisture content thereof significantly varies depending on the freshness of the minced meat employed as a raw material, the treating procedure and the presence of $Ca^{2+}$ and $Mg^{2+}$.

Furthermore salt-soluble proteins escaping from the rotary strainer or screw press in a conventional pprocess for producing ground meat cannot be recovered, which lowers the yield of the salt-soluble proteins and makes it impossible to relieve the drainage load.

Furthermore, since leaching of fish meat with NaCl for dehydration and decoloring and with $Ca^{2+}$ and $Mg^{2+}$ for dehydration, which is sometimes carried out in the final step of a conventional process for producing ground meat, is effected on muscle bundles, the effects thereof are yet insufficient. Thus the purpose and effects thereof are not evident.

In order to solve these problems accompanying conventional processes for producing ground meat, Japanese Patent Laid-Open No. 11762/1981 proposed a process for producing a myofibril jelly which comprises grinding animal myofibril in water or a liquid phase in the same of larger amount as that of the myofibril and applied a centrifugal force of 3,000 G or more to the protein suspension thus obtained.

However fish bodies are not ground as such by this process for producing a myofibril jelly. Further it is not always possible to produce an excellent ground meat having a sufficiently higher jelly strength (i.e. gel strength) than conventional ones thereby.

There is no systematically established method for masking i.e., deodorizing food, particularly marine products. Thus traditional techniques mainly with the use of natural materials are applied thereto. For example, conventional techniques therefor include the use of burdock for masking the muddy odor of dojo (*Misgurnus anguillicaudata*); the use of milk for masking fishy smells; and the flavoring effects of koji-mold and spices.

However these masking agents are added to food, in particular marine products, usually not at the stage of raw materials but at the final seasoning step.

SUMMARY OF THE INVENTION

Accordingly it is a first object of the present invention to solve these problems by providing a novel process for producing a ground meat by which fish bodies can be ground as such; marine products which cannot be ground by conventional processes can be ground; and the lavorsaving, an increased yield and the utilization of conventionally unutilized resource can be achieved.

It is a second object of the present invention to provide a novel process for producing a ground meat which comprises completely separating salt-soluble proteins to thereby give a ground meat of excellent properties.

It is a third object of the present invention to provide a novel process for producing a ground meat which comprises treating fish meat proteins in such a manner as to prevent a significant increase in the temperature thereof to thereby maintain the thermal stability of the fish meat proteins and the activities of the salt-soluble proteins thus giving a ground meat of excellent properties.

It is a fourth object of the present invention to provide a novel process for producing a ground meat which comprises substantially completely removing fish meat proteins other than salt-soluble ones, i.e., water-soluble ones which might inhibit the gelation to thereby maintain the activities of the salt-soluble proteins, thus giving a ground meat ofexcellent properties.

It is a fifth object of the present invention to provide a novel process for producing a ground meat by which an excellent ground meat of a high commercial value having a well-controlled moisture content of 80 to 90% is obtained.

It is a sixth object of the present invention to provide a novel process for producing a ground meat by which an excellent ground meat of a high commercial value, being free from fishy smell and having a preferable taste and an improved color is obtained.

It is a seventh object of the present invention to provide a novel process for producing a ground meat wherein the salt-soluble proteins are almost completely recovered to thereby significantly relieve the drainage load.

It is an eighth object of the present invention to provide a novel process for producing a ground meat wherein the process for producing a ground meat is fundamentally improved and simplified to thereby significantly lower the initial and running costs of the same.

It is a nineth object of the present invention to provide a novel process for producing a ground meat which comprises establishing the process for producing a ground meat in a closed system to thereby give an excellent ground meat of a high commercial value.

It is a tenth object of the present invention to provide a novel process for producing a ground meat wherein an excellent ground or minced meat can be selectively produced depending on the purpose at a high yield.

According to the present invention, these objects can be achieved by providing a process for producing a ground meat which comprises grinding fish bodies or a fish meat together with water oontaining a protease inhibitor and/or a chelating agent and having an adjusted ionic strength; filtering the ground mixture thus obtained to thereby remove unground materials including fine bones, skin and pieces of internals and binding tissues therefrom; and centrifuging the liquid phase thus obtained.

DETAILED DESCRIPTION OF THE INVENTION

Now the process for producing a ground meat of the present invention and embodiments thereof will be described in detail.

The raw fish material to be employed in the process of the present invention includes not only those conventionally employed, e.g., Alaska pollack, croaker, sardine, mackerel and pike conger but also those which cannot be ground by conventional processes because of the presence of parasites, e.g., pectoral rattail, deep-sea rattail, carp, krill, cuttlefish, trepang and prawn. Further these fishes may be used in the process of the present invention as raw materials not only in the form of minced meats but also in the form of fish bodies as such.

In the embodiment of the present invention, the raw fish material as described above is ground together with water containing particular additive(s) and having an adjusted ionic strength. The extent of the grinding may appropriately vary to thereby grind the material from a minced meat level (3 to 10 mm in diameter) to a myofibril level. It is particularly preferable to grind the material to the myofibril level, at which salt-soluble proteins cannot be recovered in conventional processes, exceeding the muscle bundle level, since gelation inhibitors such as water-soluble proteins present between muscle bundles, which cannot be completely separated by conventional processes, can be separated (i.e. fractionated) thereby. In addition, the evolution of heat hardly occurs during this grinding wherein the fish material is ground not alone but together with the water as mentioned above.

The water may be preferably employed in an amount one to ten times, particularly preferably three to five times, as much as that of the raw fish material. The employment of the water in an amount within the range as defined above makes it possible to obtain a ground meat of an improved color, fishy smell and taste compared with conventional ones, to recover the salt-soluble proteins at a yield exceeding 95% and to maintain the enzymatic activities of the salt-soluble proteins on a higher level than those in conventional ones. When the amount of the water is less than that of the raw fish material, these effects can be hardly achieved. On the other hand, when the amount of the water exceeds ten times that of the raw fish material, these effects are not enhanced in proportion to the amount of the adeed water. Thus it is not desirable from the practical viewpoint.

The ionic strength of the water is adjusted in order to elevate the dehydration efficiency and the yield of the recovery of the salt-soluble proteins in the separation of the salt-soluble proteins and the elution of the gelation inhibitors as well as to decolor and deodorize. A preferable ionic strength is from 0.01 to 0.10. More particularly, it is preferable to adjust the same to 0.02 to 0.08 in order to elevate the dehydration efficiency and the yield of the recovery of the salt-soluble proteins and to 0.01 to 0.10 in order to decolor and deodorize. An ionic strength lower than 0.01 hardly gives the desired effects, while that exceeding 0.10 exhibits an inverse effect of lowering the dehydration efficiency. The adjustment of the ionic strength is further effective in supressing an increase in the surface area of the material caused by grinding, which results in an increase in the moisture content. These effects obtained by adjusting the ionic strength are particularly remarkable when the raw fish material is ground to the myofibril level. The adjustment of the ionic strength of the water further brings about a washing effect. The ionic strength of the water may be adjusted with the use of, for example, NaCl, KCl, $CaCl_2$ or $MgCl_2$. The decoloring of the material may be effectively carried out by adjusting the ionic strength of the water to thereby dissolve the blood and meat pigments. In order to further completely decolor subcutaneous pigment cells, i.e., chromoproteins, it is preferable to employ a pH shift method, which comprises collecting the precipitate at a pH value of, for example, 8.0 to 8.5 and then collecting the precipitate again at a pH value of 6.8 to 7.0.

A protease inhibitor and/or a chelating agent are added to the above-mentioned water to thereby suppress, i.e., to block or chelate the gelation inhibiting enzymes increased by the use of unminced fishes in the form of rounds or dresses. When these additives are not added, a decrease in the jelly strength is observed in particular where rounds or dresses are employed as the raw fish material. It is assumed that this fact is caused by the undesirable effects of heavy metals contained in usually employed water such as tap water on the properties of the ground fish. Namely, the activities of enzymes are generally elevated in the presence of divalent metal ions, which lowers the properties of the ground meat.

Examples of the above-mentioned protease inhibitor include trypsin, pepsin and chymotrypsin inhibitors contained in, for example, bacteria, soybeans, potato, milk and albumen. Trypsin inhibitor is particularly effective and is available as a natural material as such or in the form of an extract. Trypsin inhibitor II-S is a commercially available protease inhibitor available from Sigma Chemical Company and identified in their catalog as a soluble powder from a soybean source and having an activity wherein one mg will inhibit approximately 0.6 mg of trypsin with activity of approximately 10,000 BAEE units per mg protein. In the case of trypsin inhibitor 11S marketed from Sigma Co., it is preferable to add the same in an amount of 0.3 to 3,000 μg/ml to thereby block the activities of the gelation inhibiting enzymes. When it is added in a smaller amount, the desired effect is hardly achieved. On the other hand, when it is excessively added, the effect would not increase in proportion to the amount but an undesirable change in the gel properties is observed. No obvious improving effect is observed when the above-mentioned protease inhibitor is added in the production of a ground meat by a conventional process.

Example of the above-mentioned chelating agent include EDTA, EGTA, phytic acid, citric acid, phosphoric acid and polyphosphoric acid. It should be added in an amount sufficient for chelating heavy metals present in the water and oozing out from the fish meat including bones, shells and the internals simultaneously with blocking the activities of the gelation inhibiting enzymes. For example, EDTA may be preferably added to give a concentration of 1 to 1,000 μM. Neither a smaller nor an excessive amount is preferable. No obvious improving effect is observed when the above-mentioned chelating agent is added in the production of a ground meat by a conventional process.

The above-mentioned protease inhibitor may be preferably employed together with the above-mentioned chelating agent, since the combined use thereof obviously gives synergistic effects on the jelly strength (i.e. elasticity) of the ground meat product. For example, when dresses of Alaska pollack or krills, which have been considered to be inavailable for ground meat, are used as the raw fish material, the gel strength of the product obtained by adding 0.3 to 3,000 μg/ml of a protease inhibitor and 1 to 1,000 μM of a chelating agent is 800 to 980 g. Compared thereto, the gel strength of a product obtained by adding the former alone is 680 to 750 g, while that of a product obtained by adding the latter alone is 550 to 680 g. In the case of the production of a ground meat from a raw material which is dissolved and cannot gel in the absence of these additives, the addition of 0.3 to 3 μg/ml of a protease inhibitor and 1 to 50 μM of a chelating agent results in a gel strength of 250 to 350 g. Compared thereto, the gel strength of a product obtained by adding the former alone is approximately 100 g, while that of a product obtained by adding the latter alone is approximately 150 g. In the same case as the one described above, the addition of 10 to 30 μg/ml of a protease inhibitor and 350 to 500 μM of a chelating agent results in a gel strength of 650 to 750 g. Compared thereto, the gel strength of a product obtained by adding the former alone is approximately 350 g while that of a product obtained by adding the latter alone is approximately 400 g.

In the process of the present invention, the ground mixture thus obtained is then filtered to thereby remove fine bones, skin and pieces of the internals and binding tissues therefrom, thus giving a liquid phase. Substrate proteins are completely removed by this filtration.

The above-mentioned grinding and filtration may be carried out in a short period of time with the use of, for example, a refiner, a MASUKOROIDA (the trade name of grinder), a spiral separator or a homogenizer.

In the process of the present invention, the liquid phase thus obtained is then centrifuged to give a ground meat. The centrifugation is carried out in order to suppress an increase in the surface area of the material caused by the grinding, which results in an increase in the moisture content of the same. The centrifugal separator to be employed is not limited. However it is particularly preferable to use a decanter which makes a continuous treatment in a short period, i.e., from several seconds to one minute possible. In the centrifugation, a desirable result can be sometimes obtained even by applying a centrifugal force lower than 2,000 G so long as the depth of the liquid phase, the centrifugation rate and the flow rate are appropriately controlled. However it is practically preferable to perform the centrifugation at a centrifugal force of 2,000 G or above by taking, for example, the yield and appearance of tee product into consideration. A ground meat product of the aimed moisture content can be readily obtained by appropriately controlling various conditions under a centrifugal force exceeding a predetermined level. The centrifugation at a centrifugal force of 2,000 G or above may bring about a sufficiently dehydrated and excellent ground meat of a moisture content of 80 to 90%.

In the above centrifugation, a continuous operation in a short period of time is effective in suppressing an increase in the temperature of the salt-soluble proteins to thereby maintain the activities thereof, thus giving an excellent ground meat. Further in the above centrifugation, the water-soluble proteins which inhibit gelation can be completely removed and pigments and odoriferous components are dissolved in the water and removed. Thus the obtained ground meat is excellent in properties and has a white color and a preferable taste without any fishy smell. Furthermore the fractionation depending on the specific gravity in the centrifugation makes it possible to almost completely recover the salt-soluble proteins regardless of the size of the myofibril, even the material is ground to the myofibril level, which significantly elevates the yield of said salt-soluble proteins.

In the process of the present invention, masking agents may be added in order to further deodorize the material. Examples of the masking agents include animal proteins such as water-soluble extracts of milk and albumen and vegetable components such as extracts of greens, burdock and onion and maltol such as extracts of baked plants including used tea leaves and licorice. These masking agents may be added either to the water or to the obtained ground meat product, though the addition to the former is more effective. When maltol is employed as a masking agent, it is preferably added in an amount of 0.01 to 0.2% by weight to the water and in an amount of 0.1 to 1.0% by weight to the ground meat. These masking agents may be added to a product such as kamaboko obtained by further processing the ground meat. However only the minimum effect can be obtained in this case and it is required to add, for example, 0.6 to 2.5% by weight of maltol.

In the process of the present invention, sugars or sugar alcohols may be added to the water or to the ground meat. The addition of sugars or sugar alcohols to the water exhibits a known effect of preventing denaturation caused by freezing. In order to fully exhibit the effect of preventing denaturation caused by freezing, sugars or sugar alcohols may be preferably added in an amount of 1 to 10% by weight, particularly preferably 5 to 10% by weight. We have further found that the addition of sugars or sugar alcohols to the water exhibits an effect similar to that obtained by adding a chelating agent or a protease inhibitor thereto, i.e., preventing the inhibition of gelation by the water-soluble proteins, thus elevating the dehydration efficiency as well as the gel strength of the obtained gronnd meat. It is considered that these facts may be caused by the blocking effect of hydrogen bonds, which are formed between the sugars or sugar alcohols added in the water and the surfaces of protein molecules of the raw fish material, on the gel inhibitors and the chelating effects of said sugars or sugar alcohols. The sugars or sugar alcohols, for example, sorbitol may be preferably added to the water in an amount of 1 to 10% by weight, particularly preferably 1.0 to 5.0% by weight. The addition of a smaller amount of the sugars or sugar alcohols might exhibit no effect, while an excessive amount thereof might result in a decrease in the gel strength caused by an increase in the ionic strength of the sugar and lower the yield of the recovered salt-soluble proteins As described above in detail, the process for producing a ground meat of the present invention comprises liquid phase separation wherein a raw fish material is ground together with water to give a liquid phase, which is then filtered and centrifuged. Thus it is fundamentally different from conventional solid phase separation processes comprising leaching minced meat with water followed by straining and dehydrating. In other words, fish meat proteins are treated in a conventional process by removing water-soluble proteins from minced meat by leaching the meat with water; removing substrate proteins from the meat by straining the same; and separating salt-soluble proteins from the meat by dehydration successively. In contrast thereto, fish meat proteins are treated in the process of the present invention by separating salt-soluble, water-soluble and substrate proteins from a raw fish material by grinding the material; removing the separated substrate proteins by filtration; and removing the water-soluble proteins and recovering the salt-soluble proteins by centrifugation, fundamentally different from conventional ones. The process of the present invention is further different from conventional ones in that the removal or separation of various proteins can be completely and readily effected in a short period without fail by adjusting the ionic strength and adding additives such as protease inhibitors and/or chelating agents in the former process, while the separation or removal of various proteins cannot be completely effected but requires a prolonged period of time accompanied by the evolution of heat in the latter processes. In addition, it is possible to make fishy smell ingredients, pigments and undesirable taste ingredients contained in the fish material soluble in water to thereby remove the same in the process of the present invention.

In order to illustrate the process for producing a ground meat of the present invention, the following Examples and Comparative Examples will be given.

EXAMPLE 1

To dresses of Alaska pollack, deionized tap water having an ionic strength adjusted to 0.05 with NaCl and containing 2,500 $\mu$g/ml of trypsin inhibitor 11S (mfd. by Sigma Co.) in an amount five times as much as the fish material was added. The obtained mixture was then ground to a myofibril level with a homogenizer for one minute and filtered. The liquid phase thus obtained was centrifuged by applying a centrifugal force of 2,000 G thereto for 30 seconds to thereby give a ground meat.

The obtained ground meat had an improved color, fishy smell and taste compared with conventional ones. The ionic strength thereof was 700 g while the moisture content thereof was 85%. The yield of salt-soluble proteins was 97% and the enzymatic activities of the salt-soluble proteins were higher than those of conventional ones.

EXAMPLE 2

The procedure of Example 1 was followed except that 750 $\mu$M of EDTA was added to the water instead of the trypsin inhibitor to give a ground meat.

The ground meat thus obtained had an improved color, fishy smell and taste compared with conventional ones. The gel strength thereof was 630 g while the moisture content thereof was 85.5%. The yield of salt-soluble proteins was 98% and the enzymatic activities of the salt-soluble proteins were higher than thoee of conventional ones.

EXAMPLE 3

The same amount of EDTA as the one described in Example 2 was further added to the water of Example 1 and a ground meat was produced in the same manner as the one described in Example 1.

The ground meat thus obtained had an improved color, fishy smell and taste compared with those of Examples 1 and 2. The gel strength thereof was 850 g while the moisture content thereof was 85.5%. The yield of salt-soluble proteins was 98.5% and the enzymatic activities of the salt-soluble proteins were higher than those of Examples 1 and 2.

EXAMPLE 4

The procedure of Example 3 was followed except that the grinding period was adjusted to 15 seconds and that each dress was ground to a size of 1 mm in width and mm in length to give gel dumplings. The gel strength thereof was 340 g while the moisture content thereof was 81.5%. The yield of salt-soluble proteins was 99.5%.

EXAMPLE 5

The procedure of Example 3 was followed except that Alaska pollack rounds were employed instead of the dresses and that the grinding and filtration were effected with a MASUKOROIDA and a spiral separator for three minutes to thereby ground the material to a myofibril level to give a ground meat.

The ground meat thus obtained was in the form of dumplings and the gel strength thereof was 200 g while the moisture content thereof was 80.5%. The yield of salt-soluble proteins was 98.0%.

EXAMPLE 6

The procedure of Example 3 was followed except that 0.05% by weight of maltol was further added to the water. Thus a ground meat further deodorized as compared with that of Example 3 was obtained. The addition of the maltol in the same amount as described above to the ground meat as produced in Example 3 brought about a deodorizing effect, although it was inferior to that obtained by adding the maltol to the water.

EXAMPLE 7

After adding 7% by weight of sorbitol, the ground meat as produced in Example 3 was stored at −35° C. for six months. As a result, no change in the stress nor in the solubility thereof was observed.

Separately the procedure of Example 3 was followed except that 1.5% by weight of sorbitol was further added to the water. Thus the ionic strength of the product and the dehydration efficiency were elevated. The ground meat thus obtained was excellent in properties and had a gel strength of 850 g and a moisture content of 82%. The yield of salt-soluble proteins was 98.5%.

EXAMPLE 8

The procedure of Example 3 was followed except that krills, which have been considered to be inavailable for the production of ground meat, was employed instead of the Alaska pollack. Thus an excellent ground meat having a gel strength of 960 g and a moisture content of 89.2% was obtained. The yield of salt-soluble proteins was 92%.

COMPARATIVE EXAMPLE 1

The procedure of Example 1 was followed except that water having an ionic strength adjusted in the same manner as the one described in Example 1 was employed instead of the water having an adjusted ionic strength and containing the protease inhibitor. Thus a meat mass having no commercial value was obtained. The gel strength thereof was 100 g while the moisture content thereof was 83%. The yield of salt-soluble proteins was 95.5%

COMPARATIVE EXAMPLE 2

The procedure of Example 1 was followed except that water containing the protease inhibitor alone in the same amount as the one described in Example 1 was employed instead of the water containing the protease inhibitor and having an adjusted ionic strength. Thus a size-like meat paste was obtained. The gel strength thereof was 50 g and the moisture content thereof was 94%. The yield of salt-soluble proteins was 85%.

What is claimed is:

1. A process for producing a ground meat, which comprises grinding raw fish bodies or raw fish meat to a myofibril level in a liquid containing 0.3 to 3000 μg/ml of protease inhibitor and 1 to 1,000 μm of chelating agent and having an adjusted ionic strength; filtering the ground mixture thus obtained to remove fine bones, skin and pieces of the internals and binding tissues therefrom; and centrifuging the obtained liquid phase at a centrifugal force of 2,000 g or above to obtain the ground meat containing 80 to 90% of moisture.

2. A process for producing a ground meat as set forth in claim 1, wherein said liquid is water and is employed in an amount one to ten times as much as that of the fish bodies or fish meat.

3. A process for producing a ground meat as set forth in claim 1, wherein the ionic strength of the liquid is adjusted to 0.01 to 0.10.

4. A process for producing a ground meat as set forth in claim 1, wherein said ground meat contains 80 to 90% of moisture.

5. A process for producing a ground meat as set forth in claim 1, wherein 0.01 to 1.0% by weight of animal protein is added to the liquid or the ground meat.

6. The process of claim 5 wherein said animal protein is added in the form of milk.

7. A process for producing a ground meat as set forth in claim 1, wherein 1 to 10% by weight of sugars or sugar alcohols are added to the liquid or the ground meat.

8. The process of claim 1 wherein 0.1 to 1% by weight albumen is added to the liquid or to the ground meat.

9. The process of claim 1 wherein the raw fish bodies or raw fish meat are bodies or meat from pectoral rattail, deep sea rattail, carp, krill, cuttlefish, trepand or prawn.

* * * * *